United States Patent [19]

Vandersmissen

[11] 3,887,642

[45] June 3, 1975

[54] POWDERED THERMOSETTING COMPOSITIONS

[75] Inventor: André Vandersmissen, Brussels, Belgium

[73] Assignee: UCB, Brussels, Belgium

[22] Filed: Oct. 19, 1973

[21] Appl. No.: 407,985

[30] Foreign Application Priority Data

Oct. 20, 1972   United Kingdom............... 48337/72

[52] U.S. Cl............. 260/850; 117/21; 117/161 LN; 117/161 UA; 260/30.6 R; 260/31.8 M; 260/31.8 T; 260/39 R; 260/42.29; 260/80.3 N; 260/851; 260/856
[51] Int. Cl....................... C08g 37/34; C08g 37/32
[58] Field of Search ....... 260/850, 851, 856, 80.3 N

[56]   References Cited
UNITED STATES PATENTS

| | | | |
|---|---|---|---|
| 2,520,100 | 8/1950 | Morfit................................ | 260/67.6 |
| 3,113,117 | 12/1963 | Gosselink et al................... | 260/850 |
| 3,317,474 | 5/1967 | Jones.................................. | 260/850 |
| 3,382,294 | 5/1968 | Christenson et al............... | 260/850 |
| 3,624,232 | 11/1971 | Van Dorp........................... | 260/850 |
| 3,759,854 | 9/1973 | Chang et al........................ | 260/850 |
| 3,766,110 | 10/1973 | Curado et al...................... | 260/850 |

*Primary Examiner*—John C. Bleutge
*Attorney, Agent, or Firm*—Wenderoth, Lind & Ponack

[57]   ABSTRACT

Powdered thermosetting compositions, comprising I a resinous constituent selected from the group consisting of (1) a mixture of a saturated linear or branched chain resin (A) containing free reactive groups selected from hydroxyl and carboxyl groups and an aminoplast resin (B) selected from the group consisting of polyamide-aldehyde resins, polyamide-aldehyde resins, etherified polyamine-aldehyde resins and etherified polyamide-aldehyde resins, and (2) a self-thermocross-linking resin containing N-methylolamide or alkoxylated N-methylolamide groups; II a polycondensation catalyst (C) consisting of an alkyl monoester of a halogenated aromatic polycarboxylic acid; and III auxiliary agents (D) for coating compositions; processes for the preparation of these powdered compositions and the use thereof as protective and/or decorative coatings on articles which are conductors of electricity.

23 Claims, 1 Drawing Figure

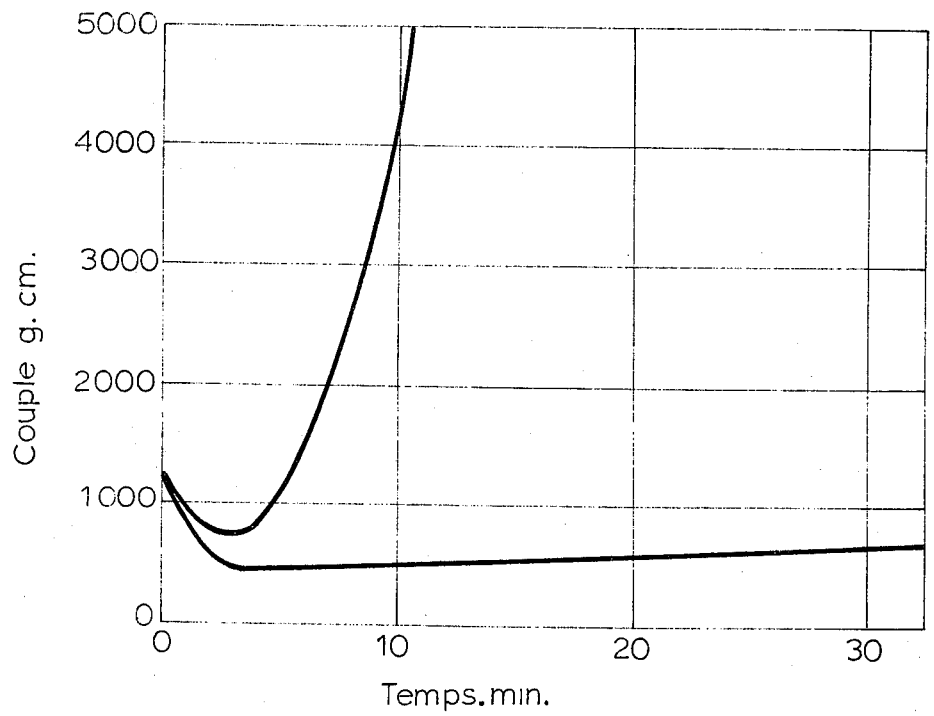

POWDERED THERMOSETTING COMPOSITIONS

The present invention is concerned with powdered thermosetting compositions, with the preparation thereof and with their use as protective and/or decorative coatings on articles which are conductors of electricity.

For some years, the use of powdered thermosetting compositions in place of liquid thermosetting compositions has enjoyed an ever increasing success, which is justified for the following reasons:

a. they contain no solvents; consequently, this avoids the problems of toxicity, pollution and fire, caused by the evaporation of solvents when liquid thermosetting compositions are used to coat surfaces;

b. they are more economical, first, because they use no solvents, as stated above, and, secondly, because excess thermosetting powder which does not remain fixed on the substrate to be coated at the time of application, can be completely recovered.

Powdered thermosetting compositions are widely used, for example, for coating domestic electrical appliances, bicycles, garden furniture, accessories in the motor car industry and the like.

The technique of using powdered thermosetting compositions is very simple: these powders can be applied by means of a spray gun on to an electrically conductive article to be coated, at an average potential difference of approximately 50,000 V. Consequently, a uniform coating of powder is formed on the article while excess powder, which does not adhere to the article due to the insulating effect of the powder already retained, can be recovered. The coated article is then heated in an oven in which the cross-linking of the thermosetting binder of the coating takes place; it thus acquires its final chemical and mechanical properties.

There are various types of powdered thermosetting compositions. The first to be used were those based on epoxy resins. However, their behaviour in sunlight and when exposed to bad weather left much to be desired: they became "floury", which means that the coating obtained lost their initial brightness and disintegrated, yielding a white dust and so losing their protective capacity.

Other types with a satisfactory behaviour when exposed to sunlight and bad weather are more complex compositions which, in principle, contain the following constituents:

A. a saturated linear or branched-chain resin containing free reactive groups, for example hydroxyl or carboxyl groups;

B. an aminoplast resin of the polyamine- or polyamide-aldehyde type, possible etherified by an alcohol; the constituents A and B may also be replaced by a single resin which is self-thermo-cross-linking (for example a vinyl/N-methylol-acrylamide copolymer);

C. a cross-linking catalyst (polycondenser) for A and B (or for the self-thermo-cross-linking resin;

D. auxiliary agents (milling agents, fluidity regulators, surface-active agents, adjuvant resins, plasticizers, pigments, dyestuffs, fillers and the like).

There are two main techniques for preparing the powdered thermo-setting compositions:

1. The resinous constituents are melted, the pigments, catalysts and other additives are added and these various constituents are blended carefully, while heating, until a homogeneous mixture is obtained, which is then cooled and ground;

2. The resinous components are dissolved in a solvent, to the solution are added the pigment, the catalyst and other additives, which is followed by grinding to obtain a homogeneous suspension, after which the solvent is evaporated, particularly by "spray drying", in order to obtain a powder.

In the language of the art, operations 1 and 2 are called "pigmentation". It is, however, difficult to prepare perfect powdered thermosetting compositions because they must often satisfy contradictory criteria. For example, these powders must not re-agglomerate while being handled, transported or stored, which means that they have to be bereft of adhesive and consequently must have a sufficiently high melting point. For a melt phase pigmentation, as described in 1 above, it is however necessary for the melting point of the resinous components to be sufficiently low to ensure satisfactory wetting of the pigments and other solid substances by the molten resinous components. Experience has shown that the saturated resinous constituent A defined hereinabove must, for these reasons, have the following physico-chemical characteristics:

a. a glass transition temperature above 40° but below 80°C.;

b. a softening temperature between 70° and 130°C.;

c. in the molten state, a viscosity between 10 and 5,000 poises at 180°C.

Furthermore, during the course of pigmentation, the viscosity of the thermosetting composition must not increase, indeed, any onset of cross-linking would result in a corresponding increase in viscosity, which would reduce the flow properties of the mixture applied to the substrate to be coated and would give rise to malformations of the film applied, such as orange peeling, pinholing or the like.

Furthermore, the kinetics of the cross-linking itself must be perfectly adapted. Indeed, as the cross-linking of constituent A by constituent B is a condensation reaction, accompanied by a release of volatile substances, such as water and/or alcohol, it is necessary for these volatile substances to be able to escape freely. If the viscosity rises too greatly during the escape of these volatile substances, the degassing will create bubbles on the surface of the coating, which bubbles would no longer disappear and would irremediably alter the appearance of the surface of the film. It is, therefore, necessary for cross-linking to take place sufficiently slowly to avoid these surface defects but it must not be so slow that the cross-linking becomes uneconomical due to an excessively slow rate of production and excessively high expenditure of energy.

In fact, the non-increase in viscosity during the course of pigmentation, on the one hand, and the appropriate rate of cross-linking, on the other, are largely governed by the polycondensation catalyst. The ideal catalyst would be one which remains inert during the course of pigmentation and storage of the thermosetting resinous composition but which, at the moment of cross-linking, catalyzes this operation at the desired speed. In this respect, the catalysts hitherto used in powdered thermosetting compositions are not entirely satisfactory. Indeed, p-toluene-sulfonic acid, which is the most widely used catalyst in this kind of composition, on the one hand, already produces an onset of cross-linking during the course of pigmentation and, on the other, accelerates polycondensation too greatly at the time of the actual cross-linking (see graph No. 1 in the accompanying drawing). For this reason, attempts have been made to replace p-toluene-sulfonic acid by other catalysts, for example, succinic acid, oxalic acid, benzoic acid, citric acid or the like, but these have the drawback of decomposing at temperatures of 160° to 220°C., which are generally used for cross-linking.

Therefore, there still remains at the present time matter for improvement in the field of powdered thermosetting compositions and it is this which is the object of the present invention.

The present invention thus provides a powdered thermosetting composition, which comprises I. a resinous constituent selected from the group consisting of (1) a mixture of a saturated linear or branched chain resin (A) containing free reactive groups selected from hydroxyl and carboxyl groups and an aminoplast resin (B) selected from the group consisting of polyamine-aldehyde resins, polyamide-aldehyde resins, etherified polyamine-aldehyde resins and etherified polyamide-aldehyde resins, and (2) a self-thermo-cross-linking resin containing N-methylolamide or alkoxylated N-methylolamide groups; II. a polycondensation catalyst (C) consisting of an alkyl monoester of a halogenated aromatic polycarboxylic acid; and III. auxiliary agents (D) for coating compositions.

The saturated, linear or branched-chain resin (A) containing free hydroxyl and/or carboxyl groups, may be a polyester resin formed from at least one saturated di- or polycarboxylic acid and at least one di- or polyhydroxy alcohol. The di- or polycarboxylic acid may be an aliphatic acid, for example adipic acid, succinic acid, sebacic acid or the like, or an aromatic acid, for example ortho-, iso- or terephthalic acid or the like. Instead of the free acid, it is also possible to use a functional derivative thereof, for example, an anhydride, acid halide, ester or the like. The di- or polyhydroxy alcohol can be, for example, ethylene glycol, diethylene glycol, triethylene glycol, a polyethylene glycol, propylene glycol, dipropylene glycol, glycerol, trimethylolethane, trimethylol-propane, pentaerythritol, sorbitol or the like. When the polyester contains free hydroxyl groups, its hydroxyl index is between 25 and 200 and is preferably between 50 and 150. When the polyester contains free carboxyl groups, its acid index is between 5 and 300 and is preferably between 20 and 200.

The saturated linear or branched chain resin (A) containing free hydroxyl and/or carboxyl groups may also be a vinyl and/or acrylic polymer containing free hydroxyl and/or carboxyl groups, obtained by the copolymerisation of at least one vinyl and/or acrylic monomer (a) with at least one vinyl and/or acrylic co-monomer (b) containing free hydroxyl or carboxyl groups, or groups capable of providing hydroxyl or carboxyl groups under the reaction conditions. Examples of monomer (a) include vinyl acetate, methyl (meth)acrylate, (meth)acrylonitrile, (meth)acrylamide, styrene, vinyl alcohol, N-vinyl pyrrolidone, diallyl phthalate and the like. Examples of the comonomer (b) for introducing the free hydroxyl groups are the acrylates, methacrylates and itaconates of monoethylene glycol, diethylene glycol, propylene glycol, dipropylene glycol or glycidyl acrylate or methacrylate or the like. These co-monomers introduce, into the chain of the copolymer, free hydroxyl groups such that the hydroxyl index of the copolymer reaches a value of 5 to 350, preferably 25 to 250. Examples of the co-monomer (b) for introducing free carboxyl groups include maleic acid or anhydride, fumaric acid, acrylic acid, methacrylic acid and the like. These co-monomers introduce free carboxyl groups into the copolymer chain so that the acid index of the copolymer reaches a value of 5 to 350 and preferably of 25 to 250. However, when the polymer chain contains both hydroxyl and carboxyl groups, the sum of the indices hydroxyl and carboxyl is from 5 to 350 and preferably from 25 to 250.

The aminoplast resin (B) of the polyamine or polyamide-aldehyde type can be, for example, a condensation product of mono- or dimethylolurea, optionally etherified by an alcohol, for example methanol, ethanol, butanol or the like, or a condensation product of melamine-formaldehyde, for example trimethylolmelamine or hexamethylolmelamine, optionally etherified with an alcohol, for example methanol, ethanol, butanol, pentanol, octanol or the like.

The self-thermo-cross-linking resin (2), which can be used alone, instead of the mixture (1) of constituent (A) and constituent (B), in the compositions according to the present invention, is a copolymerisation product of at least one member selected from the group consisting of vinyl compounds, for example, vinyl acetate, vinyl chloride, vinylidene chloride, styrene or the like, and acrylic compounds, for example acrylonitrile, methacrylonitrile, ethyl acrylate, methyl methacrylate or the like, and a compound having free or alkoxylated methylolamide groups, for example N-methylol acrylamide, methoxylated N-methylol acrylamide or the like.

The catalyst (C) used in the compositions of the present invention is at least one alkyl monoester of a halogenated aromatic polycarboxylic acid. It is an excellent polycondensation catalyst for solid thermo-setting compositions because it remains substantially inactive from ambient temperature up to the temperatures used for the pigmentation of solid thermosetting compositions, which are of the order of 70° to 130°C., so that virtually no increase in viscosity is noted, either during storage or during pigmentation (see Example 1), while at cross-linking temperatures, which are generally 130° to 220°C. and preferably 160° to 180°C., cross-linking is carried out at a rate which is both sufficiently low to give the volatile products time to be released, while the resinous composition is still sufficiently fluid, and sufficiently rapid to guarantee a satisfactory rate for industrial production, while providing final coatings which have excellent mechanical and chemical properties (see Example 2).

In the alkyl monoesters of halogenated aromatic polycarboxylic acids used in accordance with the present invention, the alkyl radical is derived from a primary, secondary or tertiary monohydroxylated alcohol, which may be aliphatic and have a straight or branched chain containing 1 to 18 carbon atoms or cycloaliphatic and contain 5 to 7 carbon atoms or araliphatic and contain 6 to 8 carbon atoms or aromatic and contain 6 to 9 carbon atoms or heterocyclic and contain 5 to 8 carbon atoms. Examples of aliphatic alcohols include methanol, ethanol, propanol, isopropanol, n-butanol, isobutanol, sec.-butanol, t-butanol, 2-ethylhexanol, decanol, dodecanol, hexadecanol, octadecanol and the like. The cycloaliphatic alcohol may be, for example, cyclopentanol, cyclohexanol, methylcyclohexanol or the like. The araliphatic alcohol may be, for example, benzyl alcohol, phenylethyl alcohol or the like. The aromatic alcohol may be, for example, phenol, o-, m- or p-xylenol, p-isopropyl-phenol or the like. The heterocyclic alcohol may be, for example, furfuryl alcohol or the like.

In the alkyl monoesters of halogenated aromatic polycarboxylic acids used according to the present invention, the halogenated aromatic polycarboxylic acid preferably contains as the halogen at least one member selected from the group consisting of chlorine, fluorine and bromine. This acid is preferably a mono-, di-, tri- or tetrahalogenated orthophthalic acid, such as mono-, di-, tri- or tetrabromophthalic acid, mono-, di-, tri- or tetrachlorophthalic acid or mono-, di-, tri- or tetrafluorophthalic acid. However, the aromatic halogenated polycarboxylic acid is not limited to the halogenated derivatives of ortho-phthalic acid. Thus, it is also possible to use other halogenated acids, for example, HET acid (1,4,5,6,7,7-hexachlorobicyclo-[2.2.1]-hept-5-one-2,3-dicarboxylic acid) and the like.

The auxiliary agents (D) used in the compositions of the present invention include, for example, fluidity regulators auch as the ketone resin A (BASF), surface-active agents such as the agent sold by E. I. du PONT de NEMOURS & Co under the trademark "Zonyl-S-13", pigments, such as titanium dioxide, iron oxides and the like, organic dyestuffs, grinding auxiliaries, plasticizers, for example, dibutyl phthalate, tributyl phosphate and the like.

In the powdered thermosetting composition according to the invention, the proportions of the constituents are advantageously as follows:

I 50.01 to 149.99 parts by weight of the resinous constituent of either the mixture (1) of 99.99 to 50 parts by weight of the saturated resin (A) and 0.01 to 50 parts by weight of the aminoplast resin (B), or (2) of the self-thermo-cross-linking resin;

II 0.01 to 10 parts by weight of the catalyst (C); and

III 0.01 to 90 parts by weight of the auxiliary agents (D).

However, the preferred proportions of these constituents are as follows:

I 65 to 135 parts by weight of the resinous constituent of either the mixture (1) of 95 to 60 parts by weight of the saturated resin (A) and 5 to 40 parts by weight of the aminoplast resin (B), or (2) of the self-thermo-cross-linking resin;

II 0.5 to 5 parts by weight of the catalyst (C); and

III 0.05 to 85 parts by weight of the auxiliary agents (D).

The powdered thermosetting composition according to the present invention can be prepared in conventional manner by melting the resinous constituent I at a temperature of 70° to 130°C. and preferably of 80° to 120°C., adding the catalyst II and the auxiliary agents III, carefully mixing at the temperatures indicated hereinbefore until a homogenous mixture is obtained, which takes 5 to 10 minutes, solidifying the mixture by cooling to ambient temperature and grinding the product obtained to a powder, the particles of which have an average diameter of 0.1 to 250 microns and preferably of 30 to 120 microns.

According to another method, it is also possible to dissolve the resinous constituent I of the composition in an appropriate organic solvent, for example methylene chloride or the like, to add the catalyst II and the auxiliary agents III to the solution, to grind the mixture in order to obtain a homogeneous suspension, and to evaporate the solvent, preferably by spray drying, in order to obtain a powder, the particles of which have the average diameters stated above.

The powdered compositions according to the present invention which are thus obtained are completely suitable for coating articles, which are conductors of electricity, by means of a spray gun, using the electrostatic method generally used for this purpose. These articles are not only metallic articles but also non-metallic, electrically conductive articles, for example wet asbestos-cement agglomerates or the like.

The Examples given hereinafter illustrate the present invention. In these Examples, in order to show the variations in viscosity and evolution of the degree of cross-linking of the powdered compositions during the course of their preparation (pigmentation) and of their use (cross-linking), Brabender's Plasti-Corder apparatus is used. This apparatus makes it possible to measure the viscosity of the composition as a function of time at a given temperature. It comprises a double-walled vessel through which a thermostatically controlled fluid circulates. Mounted inside the vessel are two mixing arms driven by a variable speed motor. An appropriate assembly makes it possible to measure the torque opposed to the rotation of the two arms by the test composition. In the case of cross-linking, the maximum torque and the time necessary to obtain it are measured. This time, referred to as the "cure time", thus represents the time necessary for complete cross-linking of the composition being investigated.

EXAMPLE 1

This Example describes the behaviour at 110°C., during the pigmentation stage of two thermosetting compositions, which are identical apart from the fact that one is catalyzed by p-toluene-sulfonic acid, while the other is catalyzed by monobutyl tetrachlorophthalate, in each case in an amount of 0.5 parts by weight of catalyst to 100 parts by weight of the total composition.

Graph 1 of the accompanying drawing gives the curve at 110°C. showing the resistant torque as a function of the residence time. It will be seen that curve 1 for the composition catalyzed by p-toluene-sulfonic acid varies rapidly, leading to excessively high torque values (increase in viscosity), while curve 2 for the composition catalyzed according to the present invention shows only a very small increase which remains less than 50% of the initial value after 30 minutes' residence time at 110°C.

The powdered composition used for the tests comprises:

a. 64.5 parts by weight of the saturated polyester described hereinafter; Tg (glass transition temperature) 57°C., temperature of softening by penetrometry 78°C.; hydroxyl index 94 mg. KOH/g. of polyester;

b. 9.7 parts by weight of hexamethoxymethylmelamine;

c. 25.8 parts by weight of titanium oxide;

d. 0.5 parts by weight of catalyst;

e. 0.05 parts by weight of a surface-active agent (ZONYL-S-13) (E. I. du PONT de NEMOURS & Co) and 0.5 parts by weight of a fluidity regulator (ketone resin A) (BASF).

In order to prepare the powdered composition, the procedure is as follows: the saturated polyester is ground to a particle size of 2 to 3 mm. and the resultant powder is melted in a heated mixing screw into which component (b), component (c), catalyst (d) and additives (e) are subsequently incorporated, the temperature being maintained at 110°C. and mixing being performed during the period indicated in the graph. The pigmentation time is counted from the moment when all the constituents of the mixture have been added. In cases where this composition is being made up on an industrial scale, a mixing time at 110°C. of approximately 5 to 10 minutes will be required in order to obtain a satisfactory homogenization. The composition is then cooled and ground to a particle size of 30 to 120 microns.

The polyester (a) is prepared in a glass reactor fitted with a thermometer, an agitator, an inlet and an outlet for inert gas, a condenser and a separator for the water and methanol of condensation. Into the reactor are placed 166 g. (1 mole) isophthalic acid, 194 g. (1 mole) dimethyl terephthalate, 192 g. (0.6 mole) trimellitic anhydride and 324 g. (3 moles) neopentyl glycol and the mixture is brought to a temperature of 210° to 220°C., with agitation and while a stream of nitrogen is passed through it. Transesterification is continued until an acid index of 1 mg. KOH/g. and a hydroxyl index equal to 94 mg. KOH/g. are obtained, which takes approximately 20 hours.

The resultant resin is cooled and ground to produce particles with a size of less than 2 to 3 mm.

EXAMPLE 2

The compositions used in this Example are the same as those used in Example 1 except that the catalyst content (i.e. p-toluene-sulfonic acid or monobutyl tetrachlorophthalate) and the cross-linking temperature are varied.

The maximum torques and the cure time are measured on the Brabender Plasti-Corder for each of the compositions tested, the following Tables giving the results obtained:

| 1. Catalysis using monobutyl tetrachlorophthalate | | | |
|---|---|---|---|
| Temperature | Percentage of catalyst | Resistant torque(g/cm) | Brabender cure time (minutes) |
| 160°C. | 0 | 2,680 | 30 |
|  | 0.1 | 2,680 | 20 |
|  | 0.2 | 2,680 | 16 |
|  | 0.3 | 2,730 | 12.25 |
|  | 0.4 | 2,730 | 11 |
| 180°C. | 0 | 1,720 | 11.5 |
|  | 0.1 | 1,720 | 8.5 |
|  | 0.2 | 1,720 | 6.5 |
|  | 0.3 | 1,720 | 5.75 |

| 2. Catalysis using p-toluene-sulfonic acid | | | |
|---|---|---|---|
| Temperature | Percentage of catalyst | Resistant torque (g/em) | Brabender cure time (minutes) |
| 160°C. | 0.2 | 3,500 | 12.5 |
|  | 0.3 | 3,500 | 9 |
|  | 0.4 | 3,500 | 9 |

From these Tables it is evident that:
1. At the selected cross-linking temperature, the catalyst used according to the present invention reduces the cross-linking time in comparison with an identical composition which contains no catalyst, the cross-linking times remaining sufficiently long to allow satisfactory degassing from the coating and a good spread of composition over the substrate.
2. The resistant torque (viscosity) is relatively low, which likewise contributes to a satisfactory spreading of the composition over the substrate.
3. On the contrary, the composition catalyzed with p-toluene-sulfonic acid at 160°C. has a markedly shorter cross-linking time than that catalyzed with the catalyst of the present invention and its resistant torque is also markedly higher; spreading of the film of coating over the substrate is, therefore, clearly less satisfactory.
4. Cross-linking with p-toluene-sulfonic acid at 180°C. cannot be carried out because the cross-linking times have become far too short; the films deposited on the substrate are not bright and, under microscopic examination, the presence is observed of a multitude of microbubbles which have broken the surface of the film.
5. On the contrary, both at 160° and 180°C., the film obtained according to the present invention has adhered well to the substrate, it has a satisfactory brightness and there is no trace of orange peeling or of microbubbles.

EXAMPLE 3

In this Example, the resinous constituent used is a self-thermo-cross-linking resin, the preparation of which is described hereinafter. To 100 parts of this resin are added 30 parts titanium dioxide and either 0.3 parts by weight p-toluene-sulfonic acid or 0.3 parts by weight of monobutyl tetrachlorophthalate (according to the present invention).

In the case of the composition which contains p-toluene-sulfonic acid, there is observed, as in Example 1, a rise in the viscosity during the course of pigmentation and, as with Example 2, cross-linking takes place too rapidly.

On the other hand, the composition according to the present invention remains perfectly stable up to 150°C. (pigmentation) and a regular cross-linking effect is observed above this temperature, which makes it possible to obtain very bright and readily adhering coatings.

The self-thermo-cross-linkable resin used in this Example was prepared in the following way: in a reactor, such as that used in Example 1, are mixed 100 parts by weight toluene, 36 parts by weight styrene, 32 parts by weight methyl methacrylate, 22 parts by weight ethyl acrylate and 10 parts by weight butoxy-N-methylacrylamide; the reactor is flushed with nitrogen and 4 parts by weight benzoyl peroxide and 1 part by weight of n-dodecyl mercaptan are added. The mixture is stirred, while the temperature is increased to 110°C., this temperature being maintained for 10 hours, stirring being continued. The mixture is then cooled and poured slowly into 10 times its volume of hexane, which causes the formation of a white precipitate which is dried for 24 hours under a reduced pressure of 15 mm. Hg. The resultant polymer is in the form of a white powder having a glass transition temperature of 50°C.

EXAMPLE 4

This is an Example of a composition according to the present invention which comprises a hydroxylated acrylic resin:

a. 70 parts by weight of the said hydroxylated acrylic resin, Tg approximately 50°C.; hydroxyl index 120; softening temperature approximately 110°C.;
b. 15 parts by weight of hexamethoxymethyl-melamine;
c. 15 parts by weight titanium dioxide;
d. 0.5 parts by weight monobutyl tetrachlorophthalate.

This composition is pigmented in the same way as in Example 1.

The hydroxylated acrylic resin used in (a) above is prepared in the following manner: into the same reactor as used in Example 1 are placed:

100 parts by weight toluene;
30 parts by weight hydroxypropyl methacrylate;
35 parts by weight methyl methacrylate;
35 parts by weight butyl methacrylate;
4 parts by weight benzoyl peroxide;
2 parts by weight n-dodecyl mercaptan.

This mixture is brought to the reaction temperature (110°C.) and maintained at that temperature for 10 hours. The reaction mixture is then cooled and precipitated in 10 times its volume of hexane. The polymer precipitate is filtered and then dried for 24 hours in a vacuum (15 mm.Hg.) at 25°C. It is obtained in the form of a coarse white powder.

EXAMPLE 5

Hereinafter are given Examples of powdered compositions which have been applied to bonderized steel with a thickness of 0.65 mm. Each powdered composition is sprayed by means of a gun into an electrostatic field at a voltage of 65 KV. The thickness of the resultant deposit is approximately 75 microns and the cross-linking time is 10 minutes at 180°C. The characteristics shown in the Table given hereinafter are those of the coatings obtained with the following powdered compositions:

a. the composition of Example 1 catalyzed by 0.5 parts by weight p-toluene-sulfonic acid (not in accordance with the present invention);
b. the composition of Example 1 catalyzed by 0.5 parts by weight monobutyl tetrachlorophthalate;
c. the composition of Example 1 catalyzed by 0.5 parts by weight monobutyl tetrachlorophthalate but containing no surface-active agent;
d. the composition of Example 1 catalyzed by 0.5 parts by weight monobutyl tetrachlorophthalate and also containing 10 parts by weight triglycidyl isocyanurate;
e. the composition of Example 3 catalyzed by 0.5 parts by weight monobutyl tetrachlorophthalate;
f. the composition of Example 4 catalyzed by 0.5 parts by weight monobutyl tetrachlorophthalate.

This Table clearly shows the superiority of the compositions according to the present invention (b, c, d, e, f) compared with the composition (a) which is catalyzed with p-toluene-sulfonic acid.

EXAMPLE 6

The compositions used in this Example are the same as those of Example 1, except that the halogenated catalyst monobutyl tetrachlorophthalate of Example 1 is replaced by 0.5 parts by weight of monobutyl tetrabromophthalate.

During pigmentation, at 120°C., the composition containing p-toluene-sulfonic acid undergoes an increase in viscosity. During cross-linking, the system proves to be too quick and the coating obtained has a deficient aspect.

Under the same conditions, the composition containing monobutyl tetrabromophthalate remains stable during the process of pigmentation and it is transformed, after cross-linking, into a bright coating of regular aspect.

EXAMPLE 7

In this Example, the catalytic activity of p-toluene-sulfonic acid is compared with that of monobutyl 1,4,5-,6,7,7-hexachlorobicyclo-[2.2.1]-hept-5-ene-2,3-dicarboxylate. All other ingredients used in this Example are the same as those of Example 1; the amount of catalyst being 0.5 parts by weight.

The powdered composition containing p-toluene-sulfonic acid is unstable during the pigmentation stage and leads to too high resistant torque values.

On the contrary, the pigmented composition according to the invention comprising the above-mentioned halogenated catalyst remains stable and undergoes only a very slight increase in viscosity.

At 180°C., on using p-toluene-sulfonuc acid, the cross-linking leaves on the substrate a mat film, the surface of which is cribbled with microbubbles, whereas the use of the composition according to the invention comprising the above-mentioned chlorinated catalyst

| Composition | Adhesion DIN 53151 | Shock test * | Gardner brightness 60°** | Erichsen penetration *** | Persoz hardness **** | Flexibility under conical mandrel ***** | Resistance to methyl ethyl ketone |
|---|---|---|---|---|---|---|---|
| a) | | 24 kg × cm | 40% | 6 mm | 250–300 dry | low | no softening |
| b) | Gt - 0 | greater than 30 kg × cm | 94% | 10 mm | 270 dry | very good | no softening |
| c) | Gt - 0 | greater than 30 kg × cm | 90% | 10 mm | 300 dry | very good | no softening |
| d) | Gt - 0 | greater than 31 kg × cm | 95% | 10 mm | 300 dry | very good | no softening |
| e) | Gt - 0 | 25 kg × cm | 90% | 8 mm | 250 dry | very good | no softening |
| f) | Gt - 0 | 30 kg × cm | 94% | 10 mm | 300 dry | very good | no softening |

\* Gardner Impact Test, Steel Kitchen Cabinet Institute 1949
\*\* ASTM D 523-67
\*\*\* DIN 53.156
\*\*\*\* NF : T 300 16
\*\*\*\*\* ASTM D 522-60 leads to a quite bright coating without surface defects, which is readily adhering to the substrate.

I claim:

1. A powdered thermosetting composition comprising
   I. 50.01 to 149.99 parts by weight of a resinous constituent selected from the group consisting of
      1. a mixture of a linear or branched chain saturated resin (A) containing free hydroxyl and/or carboxyl groups and an aminoplast resin (B) selected from the group consisting of polyamine-aldehyde resins, polyamide-aldehyde resins, etherified polyamine-aldehyde resins and etherified polyamide-aldehyde resins, and
      2. a copolymer of a vinyl and/or an acrylic compound with a copolymerizable compound having free or alkoxylated methylolamide groups,
   II. 0.01 to 10 parts by weight of a polycondensation catalyst (C) consisting of at least one monoester of a halogenated aromatic polycarboxylic acid derived from a monohydric alcohol selected from the group consisting of aliphatic alcohols having 1 to 18 carbon atoms, cycloaliphatic alcohols having 5 to 7 carbon atoms, araliphatic alcohols having 6 to 8 carbon atoms, aromatic alcohols having 6 to 9 carbon atoms and heterocyclic alcohols having 5 to 8 carbon atoms and from a halogenated aromatic polycarboxylic acid containing at least one halogen selected from the group consisting of fluorine, chlorine and bromine and
   III. 0.01 to 90 parts by weight of auxiliary agents (D) for coating compositions.

2. The composition of claim 1, in which the resinous constituent is a mixture of 99.99 to 50 parts by weight of the saturated resin (A) and 0.01 to 50 parts by weight of the aminoplast resin (B).

3. The composition of claim 1, comprising 65 to 135 parts by weight of the resinous constituent, 0.5 to 5 parts by weight of the polycondensation catalyst (C) and 0.05 to 85 parts by weight of the auxiliary agents (D).

4. The composition of claim 3, in which the resinous constituent is a mixture of 95 to 60 parts by weight of the saturated resin (A) and 5 to 40 parts by weight of the aminoplast resin (B).

5. The composition of claim 1, in which the saturated resin (A) is a polyester resin containing free hydroxyl and/or carboxyl groups, which is formed from at least one di- or polycarboxylic acid and at least one di- or polyhydric alcohol, the hydroxyl index of said polyester being between 25 and 200 when the polyester contains free carboxyl groups and the acid index of said polyester being between 5 and 300 when the polyester contains free carboxyl groups.

6. The composition of claim 5, in which the hydroxyl index of said polyester is between 50 and 150 when the polyester contains free carboxyl groups and the acid index of said polyester is between 20 and 200 when the polyester contains free carboxyl groups.

7. The composition of claim 1, in which the saturated resin (A) is a vinyl and/or acrylic polymer containing free hydroxyl groups, the hydroxyl index of said polymer being between 5 and 350.

8. The composition of claim 7, in which the hydroxyl index is between 25 and 250.

9. The composition of claim 1, in which the saturated resin (A) is a vinyl and/or acrylic polymer containing free carboxyl groups, the acid index of which polymer is between 5 and 350.

10. The composition of claim 9, in which the acid index is between 25 and 250.

11. The composition of claim 1, in which the saturated resin (A) is a vinyl and/or acrylic polymer containing both free hydroxyl and carboxyl groups, the sum of the hydroxyl and acid indices of said polymer being between 5 and 350.

12. The composition of claim 11, in which the sum of the hydroxyl and acid indices is between 25 and 250.

13. The composition of claim 1, in which the aminoplast resin (B) is a resin selected from the group consisting of a mono- or dimethylol-urea condensation product, an etherified mono- or dimethylol-urea condensation product, a melamine-formaldehyde condensation product and an etherified melamine-formaldehyde condensation product.

14. The composition of claim 1, in which the polycondensation catalyst (C) is a mono-alkylester of a halogenated aromatic polycarboxylic acid derived from a monohydric alcohol selected from the group consisting of aliphatic alcohols having 1 to 18 carbon atoms, and from a halogenated aromatic polycarboxylic acid containing at least one halogen selected from the group consisting of fluorine, chlorine and bromine.

15. The composition of claim 1, in which the polycondensation catalyst (C) is monobutyl tetrachlorophthalate.

16. The composition of claim 1, in which the polycondensation catalyst (C) is monobutyl tetrabromophthalate.

17. The composition of claim 1, in which the polycondensation catalyst (C) is monobutyl 1,4,5,6,7,7-hexachlorobicyclo-[2.2.1]-hept-5-ene-2,3-dicarboxylate.

18. The composition of claim 1, in which the auxiliary agents (D) are selected from the group consisting of fluidity regulators, surface-active agents, pigments, organic dyestuffs, grinding auxiliaries and plasticizers.

19. A process for preparing the powdered thermosetting composition according to claim 1, which comprises melting the resinous constituent at a temperature of 70° to 130°C, adding the polycondensation catalyst (C) and the auxiliary agents (D) to the molten resinous constituent and mixing carefully at said temperature until a homogenous mixture is obtained, cooling the mixture to ambient temperature and grinding the solid product obtained to a powder, the particles of which have an average diameter of 0.1 to 250 microns.

20. The process of claim 19, in which the resinous constituent is melted at a temperature of 80° to 120°C.

21. A process for preparing the powdered thermosetting composition according to claim 1, which comprises dissolving the resinous constituent in an organic solvent, adding the polycondensation catalyst (C) and the auxiliary agents (D) to the resulting solution, grinding the mixture obtained in order to obtain a homogenous suspension and evaporating the solvent in order to obtain a powder, the particles of which have an average diameter of 0.1 to 250 microns.

22. The process of claim 21, in which the solvent is evaporated by spray drying.

23. A shaped article coated with a composition according to claim 1.

* * * * *